Feb. 15, 1966 C. O. PINGRY III 3,235,747

SENSING CIRCUIT

Filed Nov. 8, 1961

*INVENTOR.*
CARL O. PINGRY, III

BY Karl A. Ohralik

ATTORNEY.

United States Patent Office 3,235,747

Patented Feb. 15, 1966

3,235,747

SENSING CIRCUIT

Carl O. Pingry III, Lexington, Ky., assignor to International Business Machines Corporation, New York, N.Y., a corporation of New York Filed Nov. 8, 1961, Ser. No. 150,913
2 Claims. (Cl. 307—88.5)

This invention relates to a data handling circuit and more particularly to a sensing circuit capable of passing information pulses and discriminating against noise pulses.

Data information is frequently stored on magnetic tapes in the form of selectively magnetized portions of the tape. In producing electrical pulses indicative of information represented by the magnetized tape portions by establishing relative motion between the tape and magnetic reading head, electrical noise pulses are frequently introduced. In circuits wherein components, such as monostable multivibrators, are directly triggered by pulses produced in response to a magnetic head output, it is possible that noise signals will cause an untimely triggering of the multivibrator to produce erratic results. It is important to sense the output potentials produced by the magnetic head and to produce a triggering output potential only in response to information pulses.

While this invention is set forth and described herein as to it applicability in a circuit for reproducing data recorded on a magnetic tape, its application is general in that it may also be employed to discriminate against noise potentials and sense signal potentials in other applications.

It is, accordingly, a principal object of this invention to facilitate the sensing of signal potentials in the presence of noise potentials of a less magnitude.

It is another object of this invention to provide a circuit that is responsive to signal potentials of a predetermined value to produce an output signal and unresponsive to potentials less than the predetermined value.

The foregoing and other objects, features and advantages of the invention will be apparent from the following more particular description of a preferred embodiment of the invention, as illustrated in the accompanying drawings.

Figure 2:
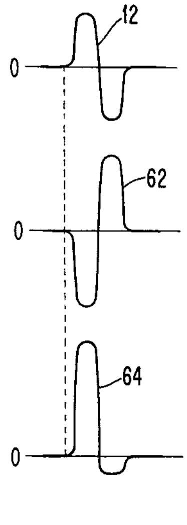
FIGURE 2 illustrates typical waveforms of potentials at different nodes of the circuit of FIGURE 1.

Referring now to the drawings for a detailed description of the invention, the reference numeral 10 represents the information reading winding of a magnetic head into which electrical signal potentials are induced in response to relative movement between the head and a magnetic tape having information recorded thereon. A typical signal potential induced in the coil 10 in response to the reading of a bit of information has a waveform as shown at 12 in FIGURE 2 of the drawings.

Signals induced in reading winding 10 are amplified by an amplifier circuit 14 including a first transistor 16 of the NPN type and a second transistor 18 of the PNP type. Transistor 16 has an emitter 20, a base 22, and a collector 24. One end of coil 10 is grounded and the other end is connected to base 22 for applying input signals to the transistor input. Biasing potential is applied to emitter 20 from a source of negative direct potential represented by the symbol —V connected through resistors 26 and 28 to the emitter 20. Biasing potential is applied to collector 24 from a source of positive direct potential represented by the symbol +V connected through resistors 30 and 32. Because the magnetic head is a unitary device containing both reading and recording windings which are magnetically coupled together, provision is made to protect transistor 16 from large potentials induced in reading winding 10 by recording fluxes during recording. To accomplish this, a pair of diodes 34 and 36 preferably of the silicon type, are connected in opposing relationship directly betwen base 22 and a line 38 connected to ground. The characteristics of these diodes are such that they present a high impedance to signal potentials of the magnitude produced during reproduction of information but present a low impedance to potentials in a range greater than the maximum reproduced signal potential. Effectively, potentials induced in winding 10 which are in this range are shorted to ground.

For minimizing the effects of noise in power sources —V and +V, emitter 20 is decoupled by a capacitor 40 connected between ground line 38 and the junction of resistors 26 and 28 and similarly collector 24 is decoupled by a capacitor 42 connected between ground line 38 and the junction of resistors 30 and 32.

Transistor 18 of amplifier 14 has an emitter 44, a base 46, and a collector 48 and the output of transistor 16 is applied as an input to transistor 18 by a direct connection between collector 24 and base 46. Collector bias for transistor 18 is applied through resistor 50 connected between collector 48 and direct potential source —V. For applying a biasing potential to emitter 44 of transistor 18, a pair of resistors 52 and 54 are serially connected between this emitter and potential source +V. For decoupling emitter 44 from potential source +V at higher frequencies, a capacitor 56 is connected between ground line 38 and the junction of resistors 52 and 54. For effecting stabilization in the circuits, a resistor 60 is connected between emitter 20 of transistor 16 and collector 48 of transistor 18.

Transistor 16 is biased so as to operate in a class A condition over the range of input signal potentials. An input signal potential having a waveform shown at 12 in FIGURE 2 of the drawings produces an output potential at collector 24 having a waveform as shown at 62 in FIGURE 2 of the drawings. This pulse is applied to the base 46 of transistor 18 which produces at its collector, an output potential having a waveform as shown at 64 in FIGURE 2 of the drawings.

For producing an output potential pulse in response to a true information signal induced in reading winding 10, the positive pulse produced at collector 48 of transistor 18 is applied through a sensing circuit generally designated by reference numeral 66 to a monostable multivibrator circuit 68. This multivibrator includes a first transistor 70 of the PNP type having an emitter 72, a base 74, and a collector 76. For coupling the output of transistor 18 to the input of transistor 70, a capacitor 78 and a resistor 80 are serially connected between collector 48 and base 74. A capacitor 82 is connected between ground and the collector 48 of transistor 18 for upper frequency cut-off purposes. Protection for transistor 70 against excessive input potentials is afforded by a diode 89 having its anode connected to base 74 and its cathode connected to ground line 38.

Resistors 84, 86 and variable resistor 87 are serially connected between potential source —V and base 74 of transistor 70. For establishing a stable, constant potential node at the junction between resistors 84 and 86, a Zener type potential regulating diode 88, is connected between this node and ground line 38. In cases wherein the potential source —V is of satisfactory stability, diode 88 is obviated. A by-passing capacitor 90 is connected across diode 88.

Monostable multivibrator circuit 68 further includes a transistor 92 of the PNP type having an emitter 94, a base 96, and a collector 98. Biasing potentials for collector 76 of transistor 70 and base 96 of transistor 92 are derived by a potential divider including resistors 102, 104, and 106 serially connected, in the order named, between potential source —V and potential source +V. The junction between resistors 102 and 104 is connected to collector 76 of transistor 70 and the junction between resistors 104 and 106 is connected to base 96 of transistor 92. The coupling between collector 76 and base 96 is enhanced by a capacitor 108 connected between these elements. For providing a bias potential to collector 98 of transistor 92, a resistor 110 is connected between potential source —V and this collector. A capacitor 112 is connected between collector 98 of transistor 92 and base 74 of transistor 70. In accordance with an important aspect of this invention, sensing of marginal signals is enhanced by circuitry including a resistor 119 connected across capacitor 112. An output terminal 117 is connected to collector of transistor 92. Both of the emitter 72 and 94 of transistors 70 and 92 are connected directly to ground.

In a quiescent condition of the multivibrator, that is, in the absence of information signals, transistor 70 is in a state of relatively heavy conduction; and transistor 92 is in a state of very low conduction, substantially cut off. For producing an output pulse at terminal 117, it is required that the transistors of circuit 68 change their states so that transistor 70 is substantially cut off and transistor 92 is conducting heavily. To achieve this change, an appropriate signal is required to trigger transistor 70. However, it is important that transistor 70 is not triggered by noise potentials which are somewhat lower in amplitude than the minimum acceptable signal potential.

In accordance with this invention, the sensing circuit 66 in co-operation with multivibrator circuit 68 is effective to render transistor 70 insensitive to potentials at the output of amplifier 14 which are lower than a certain value but responsive to signals above this value to trigger the multivibrator circuit 68 and cause it to change state. In accordance with a feature of this invention, the sensing circuit 66 establishes a quiescent current bias condition for transistor 70 whereby signals lower than a predetermined minimum signal do not appreciably affect the conducting state of the transistor but signals greater than this value so alter the operation of the transistor as to cause it to become cut off. For a more complete understanding of the manner in which this is accomplished, reference is had to FIGURE 3 of the drawings.

Figure 3:
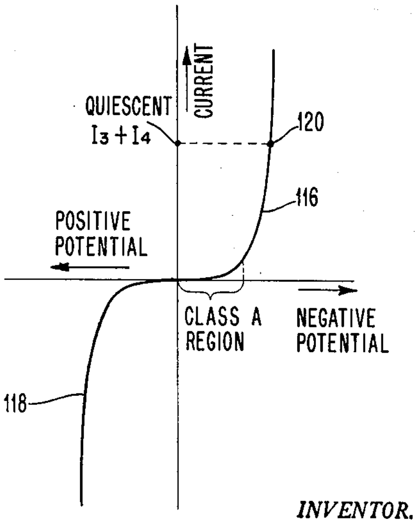
FIGURE 3 is a graph illustrating the operating characteristics of a base emitter junction of a transistor in FIGURE 1.

In the graph of FIGURE 3, the abscissa represents potential and the ordinate represents current. In the first quadrant of this graph, curve 116 represents the emitter to base current versus emitter to base potential characteristics of the transistor 70. Curve 118 in the third quadrant of this graph represents the current versus potential characteristics of diode 89. In the quiescent condition of circuit 68, the emitter to base current for transistor 70 flows from ground through this emitter-base junction, through resistors 87, 86, and 84 to potential source —V. In this case, conventional current flow from relatively positive to relatively negative potential is assumed.

Figure 1:
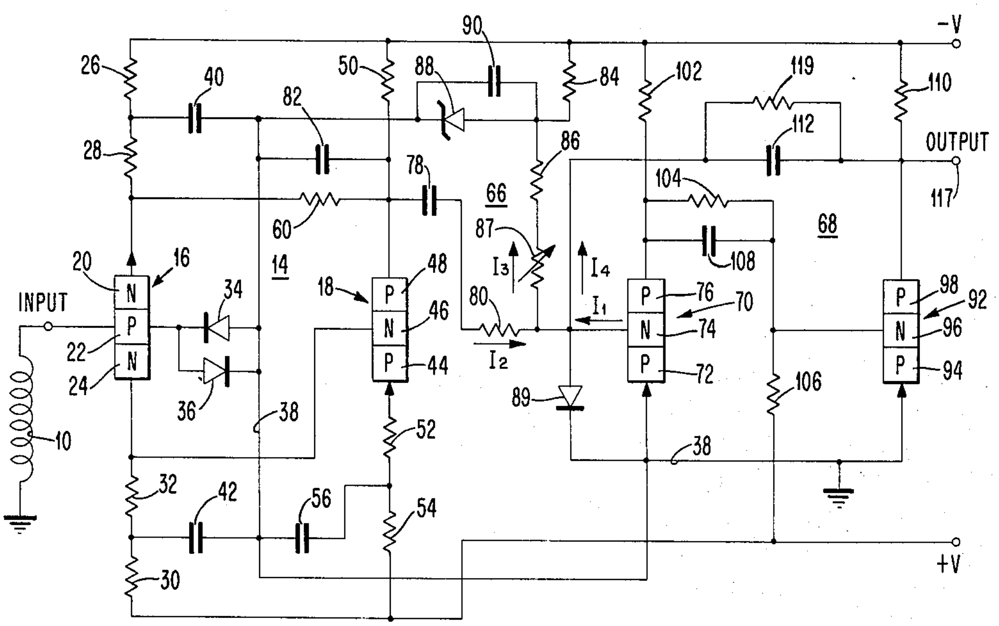
FIGURE 1 is a schematism of a circuit incorporating this invention.

The base 74 of transistor 70 may be regarded as a potential node for four emanating branches. The emitter-base junction of transistor 70 is the first branch, capacitor 78 and resistor 80 are included in the second branch, resistors 87, 86, and 84 are included in the third branch and resistors 119 and 110 are included in the fourth branch. Capacitor 112, which facilitates switching of the multivibrator, may be disregarded for these purposes since the magnitude and duration of its current is very small in relation to the currents I1 through I4. The current in the emitter-base junction of transistor 70 i.e., in the first branch, is represented by the symbol I1, the current in the second branch by the symbol I2, the current in the third branch by the symbol I3 and the current in the fourth branch by I4. These currents and their directions of flow are indicated by arrows in FIGURE 1 of the drawings. The relationship between these currents may be expressed by the equation:

$$I1=I3+I4-I2$$

The proportioning of circuit resistors is such that I3 in the quiescent condition of the circuit is much larger than I4.

In the quiescent condition of the circuit, i.e., in the absence of input signals, $I2=0$, and the above equation becomes:

$$I1=I3+I4$$

For maintaining a relatively large emitter to collector current condition in transistor 70, the base to emitter current, I1, is at a value at which the operating characteristic 116 has a relatively large slope; a typical operating point being shown at 120 in FIGURE 3 of the drawings. It should be observed that at this operating point relatively large changes in the current results in relatively low changes in potentials at the emitter-base junction. Thus, a relatively small current, I2, resulting from a signal potential change at collector 48 of transistor 18 in response to a noise input signal, for example, produces changes in current I1 from operating point 120 on curve 116 which do not significantly change the potential at base 74. Therefore, for certain increments of current, the base 74 presents an effective short circuit to signal currents. However, as signal current I2 increases and approaches the quiescent value of $I3+I4$, current I1 diminishes until the operating point on curve 116 approaches and goes beyond the knee of the curve. The currents I3 and I4 are substantially invariable in the region above the knee. As the signal current becomes large enough to cause the operating point to reach the knee of the curve and enter the class A region of transistor operation between this knee and the origin, the transistor presents a high impedance to emitter to collector current flow. As a consequence, the emitter to collector current is reduced, producing a negative potential pulse at collector 76 to initiate a transition in the monostable multivibrator 68 in a known manner to provide an output signal.

In accordance with another important feature of the invention, the current I4 changes in a manner to more effectively sense marginal input signals to the multivibrator and to provide circuit stability by preventing oscillations. For values of signal current I2 which exceed the quiescent value of $I3+I4$, the switching action is readily effected in the manner explained. The operating point goes through the class A region of operation, and some signal current is conducted by diode 89. However, for marginal signal currents which place the operating point in the class A region of the transistor between the origin and the knee of the curve 116, i.e., I2 is just less than the quiescent value of $I3+I4$, in the absence of some influence causing the operating point to go through this region, the circuit would tend to be unstable and to go into oscillation. For preventing such instability, as the operating point goes beyond the knee and the multivibrator circuit changes state, transistor 92 saturates and the value of I4 drops to substantially zero because collector 98 of transistor 92 is substantially grounded in the saturated condition of this transistor. The quiescent value of I4 can be controlled so that as I4 goes to zero, I2 exceeds I3 for marginal signals, and therefore, the operating point goes entirely through the class A region of operation of the transistor and stability of the circuit is maintained. The operating point of the transistor 70 after application of input signals of sufficient magnitude lies on curve 118 in FIG- URE 3. The incremental value of current I4 may be determined by resistors 110 and 119 in relation to circuit potentials.

It should also be observed that establishing class A operation in transistor 70 by a sufficiently large current I2 causes transistor 70 to present a high output impedance to amplifier 14 whereby the gain of the amplifier is increased during switching time. Accordingly, the switching action is even further enhanced by such increase in gain.

It is noted according to the foregoing description that a sensing circuit which is effective to cause an output potential to be produced only in response to input signals of greater than a predetermined value is provided, and that the circuit is particularly effective to sense signals of marginal value while circuit stability is maintained.

While the invention has been particularly shown and described with reference to a preferred embodiment thereof, it will be understood by those skilled in the art that various changes in form and details may be made therein without departing from the spirit and scope of the invention.

What is claimed is:

1. A sensing circuit comprising:

first and second transistors each having an emitter, a base and a collector;

said first transistor having a high impedance in a certain range of emitter to base currents and a low impedance for currents other than currents in this range;

means for establishing a quiescent condition of stability in said circuit in which said first transistor is conducting and said second transistor is cut off;

a first branch circuit emanating from the base of said first transistor and being connected through an impedance to the collector of said second transistor to form a path for direct current;

another branch circuit emanating from the base of said second transistor and being connected through an impedance to the collector of said first transistor to form a path for direct current;

second and third branch circuits emanating from the base of said first transistor;

means for establishing a predetermined current through said second branch in a first direction with respect to said base of said first transistor, said last mentioned current being of a value other than currents in said range;

signal current means sufficient to establish in said third branch a current in a direction with respect to said base of said first transistor opposite to said first direction and of a magnitude just greater than the difference between the sum of currents in said first and second branches and a current in said range to establish a high impedance condition in said first transistor and a saturated condition in said second transistor; and unidirectional impedance means responsive to said second transistor assuming said saturated condition to drop the current in said second branch to substantially zero to insure said first transistor is maintained in said high impedance condition throughout the duration of an input signal.

2. A sensing circuit comprising:

first and second transistors each having an emitter, a base and a collector;

means for establishing a quiescent condition of stability in said circuit in which said first transistor is conducting and the second is cut off;

a first branch circuit emanating from the base of said first transistor and being connected through an impedance to the collector of said second transistor to form a path for direct current;

another branch circuit emanating from the base of said second transistor and being connected through an impedance to the collector of said first transistor to form a path for direct current;

second and third branch circuits emanating from the base of said first transistor;

means for establishing currents in said first and second branch circuits in a first direction with respect to the base of said first transistor when said circuit is in its quiescent condition;

means for establishing a current through the base-emitter junction of said first transistor equal in magnitude to the sum of the currents in said first and second branches and being in a direction with respect to said base of said first transistor opposite to said first direction;

signal current means sufficient to establish a current flowing in said third branch in a direction opposite to said first direction and of a magnitude greater than the difference between the sum of currents in said first and second branches and the maximum base emitter current for class A operation of said first transistor to supplant the base-emitter current in said first transistor and cause class A operation of said first transistor to change the condition of said circuit so that said second transistor will assume a saturated condition; and unidirectional impedance means responsive to said second transistor assuming said saturated condition to reduce the current in said first branch to substantially zero to cause the base emitter current in said first transistor to reduce to substantially zero throughout the duration of an input signal.

References Cited by the Examiner

UNITED STATES PATENTS

| | | | |
|---|---|---|---|
| 2,945,966 | 7/1960 | Davenport | 307—88.5 |
| 2,976,432 | 3/1961 | Geckle | 307—88.5 |
| 2,986,649 | 5/1961 | Wray | 307—88.5 |
| 2,992,340 | 7/1961 | Floyd | 307—88.5 |
| 3,107,309 | 10/1963 | Hitt | 307—88.5 |
| 3,127,554 | 3/1964 | Kaneko | 307—88.5 X |

OTHER REFERENCES

Junction Transistor Electronics by R. B. Hurley, copyright 1958, John Wiley and Sons, Inc. (pages 423–4, FIG. 21.8 relied upon).

ARTHUR GAUSS, *Primary Examiner.*

JOHN W. HUCKERT, *Examiner.*